Patented Dec. 26, 1933

1,941,352

UNITED STATES PATENT OFFICE 1,941,352

PROCESS OF MAKING A PECTOUS COMPOSITION

Adolf Hawerlander, St. Joseph, Mo., assignor to Albert D. Stewart, St. Joseph, Mo.; Hazel Stewart administratrix of said Albert D. Stewart, deceased No Drawing. Application June 20, 1932
Serial No. 618,304

2 Claims. (Cl. 260—3)

The present invention relates to a plastic composition, and more particularly to a plastic composition derived from pectose or pectous substances and to the process of producing same.

The primary object of the invention is to provide a new composition of matter adapted to various uses.

In one form the new composition of matter is adapted to serve as an impregnating material in the lamination of impregnated sheets of fibrous materials and fabrics; to serve as a binder in the preparation of face-coatings, whitewashings, plaster-coatings, or as a glue or other adhesive.

The new composition of matter may be used advantageously as a new binder for abrasive materials, such as carborundum or aluminum oxide. Also, it may be employed in the manufacture of composition wood, for instance where it is mixed with sawdust or comminuted fibers and pressed into hard, dense boards or panels of any desired size and thickness. Again, the material may have mixed therewith a pigment or a body filler such as wood-flour, comminuted or powderized fibers of any desired material, et cetera, and in this condition may be used as a thermosetting, plastic molding composition for molding of articles in any desired form, shape or size.

The plastic composition of the present invention may be employed advantageously in connection with the saturation of felted, water-laid fiber sheets and in connection with the processes of paper making. For instance, it may be employed in aqueous suspension or in connection with other solvents, vehicles or diluents.

In its final stage the new product is infusible and also insoluble in such solvents as acetone, amyl-acetate, nitro-benzene, ethylalcohol, wood-spirits, et cetera. Also, in the final stage, the product is highly resistive to the action of acids or alkalis.

The new composition of matter is preferably compounded or produced by subjecting pectose, an aldehyde, and an excess of a ketone to a heating process under conditions resulting in the elimination of ammonia and the production of a compound having the properties of indefinite solubility and fusibility.

When, prior to this invention, pectous substances, such as can be derived from the non-fibrous residue from vegetable fibrous material, such as wheat straw were reacted in the presence of formaldehyde and a condensing agent, an intermediate condensation product was produced which was initially soluble and fusible, but in the course of time or under the influence of external temperature increase, it changed into an infusible, insoluble condensation product; the state of solubility and fusibility could not be controlled or maintained indefinitely.

I have found in the ketones and ketenes a suitable retarding agent which will prevent the intermediate stage of condensation from progressing, without the possibility of control, into the final condensation stage or stage which renders the material useless and worthless to any further processing.

A great number of ketones and ketenes are available and suitable for the purpose of my invention such as, for instance, acetone, mesityl-oxide, anthraquinone, et cetera, also the cyclohexanone and related cyclic-ketones and ketenes are included.

In order to clearly describe my invention, I will now give an example of one way of processing the pectous substance, it being understood, of course, that other methods, procedures, as well as variations in the amounts of chemicals employed will be within the scope of my invention; also I do not wish to confine myself to any limit of time or to the exact temperatures mentioned:

100 parts pectous substance,
100 parts formaldehyde, 40% strength, and
200 parts acetone are mixed together with about 15 parts of sodium hydroxide. The liquid mass is agitated and brought to the boiling point and kept boiling until all of the ammonia is eliminated. The liquid mass is then cooled and can be used in composing various compositions.

The sodium hydroxide is used as a reacting agent to eliminate the nitrogen from the mixture, which evaporates in the form of ammonia gas. If no retarding agent was used in the mixture, the mass would harden and become insoluble and infusible before the nitrogen has been driven off. I have found in the ketone and ketene group a suitable retarding agent which, when added to the pectous substances and the mixture delays the reaction until the nitrogen contained in the pectous substances is eliminated in the form of ammonia gas by reaction with sodium hydroxide.

Also, the retarding agent allows the application of a more intense heat and a longer period for application of the heat so that all of the ammonia can be driven off. This is proven by the fact that the sodium hydroxide remains, at least partially, in the remaining mass.

It shall be noted that the liquid mass is soluble and fusible and will stay indefinitely in that condition. In order to change the liquid mass into the infusible and insoluble state, a hardening agent such as hexamethylenetetramin is added which will dissolve in the liquid mass and the mass subjected to sufficient heat to induce infusibility or insolubility in the presence of the hardening agent. It is my belief that the hardening agent restores the nitrogen which is removed during the initial reaction; therefore, any nitrogenous hardening agent or agent forming nitrogen in the reaction may be used.

For producing a thermosetting molding compound utilizing the plastic composition of the present invention, the procedure may be as follows:

Equal parts by weight of filler, pigment, plastic composition and of hardening agent are mixed in a vacuum mixer or kneading machine and when thoroughly intermixed the mixture is charged into a mold. The mold may be pressed between the heated platens of a hydraulic press under about 2,000 pounds pressure per square inch. The molding compound first becomes plastic and will fill all the cavities and inner contour of the mold and will then harden into a homogeneous product representing the exact shape, size and curvature of the mold, the product becoming at that time insoluble, infusible, and of high strength and good lustre. It is to be understood, of course, that the pigments and fillers may be omitted without departing from the scope of the invention.

I claim as my invention:

1. The process of producing a condensation product, which comprises mixing a non-fibrous pectous residue, acetone and formaldehyde in the presence of an alkaline reacting agent, subjecting the mixture to the action of heat at a temperature approximating the boiling point of the mass, continuing the heat treatment until a homogeneous soluble substance is produced, mixing this substance with a hardening agent, and subjecting the resulting mass to heat until the mass becomes infusible and insoluble.

2. A process of producing a condensation product, which comprises mixing the non-fibrous pectous residue derived from wheat straw with an aldehyde and a ketone in the presence of an alkaline reacting agent, subjecting the mixture to the action of heat at a temperature approximating the boiling point of the mass, continuing the heat treatment until a homogeneous, soluble substance is produced, mixing the resultant substance with a hardening agent, and subjecting the mixed mass to heat until the mass becomes insoluble and infusible.

ADOLF HAWERLANDER.